United States Patent
Malatesta

(10) Patent No.: US 11,935,318 B2
(45) Date of Patent: *Mar. 19, 2024

(54) MAIL PROCESSING SYSTEM WITH INCREASED FIRST AND SECOND PASS SORTING SPEED

(71) Applicant: Tritek Technologies, Inc., Wilmington, DE (US)

(72) Inventor: James Malatesta, Hockessin, DE (US)

(73) Assignee: TRITEK TECHNOLOGIES, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/170,782

(22) Filed: Feb. 17, 2023

(65) Prior Publication Data

US 2023/0351792 A1    Nov. 2, 2023

Related U.S. Application Data

(63) Continuation of application No. 17/587,445, filed on Jan. 28, 2022, now Pat. No. 11,584,601, which is a
(Continued)

(51) Int. Cl.
*G06V 30/424*        (2022.01)
*B07C 1/02*          (2006.01)
(Continued)

(52) U.S. Cl.
CPC ............ *G06V 30/424* (2022.01); *B07C 1/025* (2013.01); *B07C 1/04* (2013.01); *B07C 1/10* (2013.01);
(Continued)

(58) Field of Classification Search
CPC .......... B65H 1/025; B65H 3/124; B65H 7/02; B65H 5/023; B65H 7/20; B65H 3/045;
(Continued)

(56) References Cited

U.S. PATENT DOCUMENTS 4,701,094 A    10/1987  Courjaret et al.
5,226,547 A     7/1993  Malatesta
(Continued)

FOREIGN PATENT DOCUMENTS

DE    10-2011-004091 A1    8/2012
WO    WO 2006-016186 A1    2/2006
WO    WO 2012-110412 A1    8/2012

OTHER PUBLICATIONS

The United States Postal Service, An Introduction to Mailing for Business and Organizations, "Understanding Your Mailpiece Shape" http/www.publicationprinters.com/Files/dmm200.pdf, (pp. 16-17), May 2008.

*Primary Examiner* — Mark A Deuble
(74) *Attorney, Agent, or Firm* — Devlin Law Firm LLC; James M. Lennon

(57) ABSTRACT

A mail processing system utilizes a conveyor to shingle or de-shingle mailpieces as they move through the processing system and utilizes belts to move the mailpieces. A first shingling conveyor moves a first mailpiece to overlap with a second mailpiece to create shingled mailpieces. A second shingling conveyor moves a first mailpiece away from a second mailpiece to de-shingle them to create singulated mailpieces. A camera takes images of the mailpieces in the conveyor and image analysis software is used to determine dimensional aspects of the mailpieces that are used to control the belt speeds to move mailpieces with respect to each other. A mail processing system may include a mail processing station that scans addresses, applies postage and/or weighs the mailpieces. Mail may be de-shingled prior to being weighed and then re-shingled for subsequent processing, or mail may be shingled prior to passing through a scale if weighing is not necessary.

11 Claims, 12 Drawing Sheets

Related U.S. Application Data continuation of application No. 17/119,104, filed on Dec. 11, 2020, now Pat. No. 11,235,940, which is a continuation of application No. 15/765,563, filed as application No. PCT/US2017/030144 on Apr. 28, 2017, now Pat. No. 10,875,729.

(60) Provisional application No. 62/328,982, filed on Apr. 28, 2016.

(51) Int. Cl.
| | | |
|---|---|---|
| *B07C 1/04* | (2006.01) | |
| *B07C 1/10* | (2006.01) | |
| *B65G 15/20* | (2006.01) | |
| *B65H 1/02* | (2006.01) | |
| *B65H 3/04* | (2006.01) | |
| *B65H 3/12* | (2006.01) | |
| *B65H 3/52* | (2006.01) | |
| *B65H 5/02* | (2006.01) | |
| *B65H 5/06* | (2006.01) | |
| *B65H 7/02* | (2006.01) | |
| *B65H 7/04* | (2006.01) | |
| *B65H 7/14* | (2006.01) | |
| *B65H 7/20* | (2006.01) | |
| *G06V 10/20* | (2022.01) | |
| *G06V 10/22* | (2022.01) | |
| *G06V 20/64* | (2022.01) | |

(52) U.S. Cl.
CPC .............. *B65G 15/20* (2013.01); *B65H 1/025* (2013.01); *B65H 3/045* (2013.01); *B65H 3/124* (2013.01); *B65H 3/5246* (2013.01); *B65H 5/023* (2013.01); *B65H 5/062* (2013.01); *B65H 7/02* (2013.01); *B65H 7/04* (2013.01); *B65H 7/14* (2013.01); *B65H 7/20* (2013.01); *G06V 10/22* (2022.01); *G06V 10/255* (2022.01); *G06V 20/64* (2022.01); *B65H 2404/2691* (2013.01); *B65H 2511/22* (2013.01); *B65H 2513/10* (2013.01); *B65H 2553/42* (2013.01); *B65H 2701/1916* (2013.01)

(58) Field of Classification Search
CPC ........ B65H 7/14; B65H 3/5246; B65H 5/062; B65H 2553/42; B65H 2701/1916; B65H 2511/22; B65H 2513/10; B65H 2404/2691; B65H 2220/02; B65H 2220/01; B07C 1/04; B07C 1/025; B07C 1/10; G06K 9/00201; G06K 9/2054
See application file for complete search history.

(56) References Cited

U.S. PATENT DOCUMENTS

| | | | |
|---|---|---|---|
| 5,246,223 A | 9/1993 | Ricciardi et al. | |
| 5,257,777 A | 11/1993 | Kalika et al. | |
| 5,398,922 A | 3/1995 | Malatesta | |
| 5,456,457 A | 10/1995 | Kerstein et al. | |
| 5,505,440 A | 4/1996 | Uematsu | |
| 5,521,365 A | 5/1996 | Malatesta | |
| 5,544,758 A | 8/1996 | Malatesta et al. | |
| 5,988,635 A | 11/1999 | Ohshima | |
| 6,523,697 B1 | 2/2003 | Malatesta et al. | |
| 6,571,958 B1 | 6/2003 | Malatesta et al. | |
| 6,651,878 B2 | 11/2003 | Malatesta et al. | |
| 6,761,352 B2 | 7/2004 | Scicluna et al. | |
| 7,185,748 B2 | 3/2007 | Malatesta | |
| 7,303,188 B2 | 12/2007 | Malatesta | |
| 7,361,861 B2 | 4/2008 | Malatesta | |
| 7,777,919 B2 | 8/2010 | Malatesta | |
| 7,835,540 B2 | 11/2010 | Philippe et al. | |
| 8,091,885 B2 | 1/2012 | Conaway et al. | |
| 8,162,214 B1 | 4/2012 | Malatest et al. | |
| 8,480,072 B2 | 7/2013 | Samain et al. | |
| 9,180,494 B2 | 11/2015 | Bernoussi et al. | |
| 10,875,729 B2 | 12/2020 | Malatesta | |
| 11,235,940 B2 | 2/2022 | Malatesta | |
| 11,584,601 B2 * | 2/2023 | Malatesta | ............. B65H 5/062 |
| 2004/0195760 A1 | 10/2004 | Zimmermann et al. | |
| 2008/0056878 A1 | 3/2008 | Schererz et al. | |
| 2008/0251429 A1 | 10/2008 | Norris et al. | |
| 2009/0051108 A1 | 2/2009 | Bell | |
| 2009/0121163 A1 | 5/2009 | Kinnemann et al. | |
| 2009/0218751 A1 | 9/2009 | Kutzer et al. | |
| 2010/0013142 A1 | 1/2010 | Purcell et al. | |
| 2010/0276249 A1 | 11/2010 | Kalm | |
| 2014/0231317 A1 | 8/2014 | Darmon et al. | |
| 2015/0091241 A1 | 4/2015 | Wakakusa | |
| 2015/0368056 A1 | 12/2015 | Murata | |
| 2016/0313117 A1 | 10/2016 | Pearcey | |
| 2016/0355360 A1 | 12/2016 | Shin | |

* cited by examiner

MAIL PROCESSING SYSTEM WITH INCREASED FIRST AND SECOND PASS SORTING SPEED

CROSS REFERENCE TO RELATED APPLICATIONS

This application is a Continuation application of U.S. patent application Ser. No. 17/587,445, now U.S. Pat. No. 11,584,601, which is a Continuation application of U.S. patent application Ser. No. 17/119,104, now U.S. Pat. No. 11,235,940, which is a Continuation application of U.S. patent application Ser. No. 15/765,563, now U.S. Pat. No. 10,875,729, which is a national stage entry application under 35 U.S.C. 371 of International Patent Application No. PCT/US2017/030144, filed on Apr. 28, 2017, which claims the benefit of priority to U.S. Provisional Patent Application No. 62/328,982, filed on Apr. 28, 2016; the entireties of which are hereby incorporated by reference herein.

BACKGROUND OF THE INVENTION

Field of the Invention

The invention relates generally to mail processing systems, which are described generally in the prior art, including U.S. Pat. Nos. 7,303,188; 7,361,861; 7,7777,919; 8,162,214; 5,226,547; 5,398,922; 5,521,365; 5,544,758; 6,523,697; 6,571,958; 6,651,878; and 7,185,748. Specifically, the invention relates to mail processing systems having a conveyor that de-shingles or shingles the mailpieces for processing purposes including weighing, address scanning and postage application.

BACKGROUND

Mail processing generally includes at least the steps of address scanning, postage application and weighing of the mailpieces. Scanning, postage application, and other steps may be conducted at a faster rate than weighing the mail. Therefore, the mail weighing step is rate limiting for a continuous, streamline process.

SUMMARY OF THE INVENTION

An exemplary mail processing system may include conveyors for moving mailpieces to one or more mail processing stations that include an address scanner, a postage applicator and/or a scale to weigh each mailpiece. The mail weighing step requires each mailpiece to be positioned on the scale in a singulated fashion, whereas the address scanning and postage application may be conducted with the mailpieces singulated. In order to achieve high speeds, two or more scales may be included in a mail processing system to weigh each mailpiece individually and then the mailpieces may be shingled for subsequent processing, including postage application and/or address scanning. Mailpieces may be shingled prior to reaching the scale for weighing and a de-shingling conveyor may singulate the mailpieces before they are passed over the scale. Subsequent to the weighing step, the mailpieces may enter a shingling conveyor where they are shingled for high speed throughput In some situations, mail processing system may utilize two passes for mail processing, wherein in a first pass, the mailpieces undergo the slower speed weighing step and in a second, higher speed pass the mailpieces undergo processing steps such as address scanning and postage application. In this situation, mailpieces may remain shingled while passing through the scale in the second pass in order to maintain a faster overall rate of processing in the second pass. In this manner, the footprint of the mail processing system may be kept small and overall speeds may be optimized with a multi-pass method of processing the mail.

In an exemplary embodiment, a mail processing system comprises a conveyor that comprises a first belt assembly and a second belt assembly that can be driven at varying speeds. A camera is configured to take images of the mailpieces as they pass into or through the conveyor and the speeds of the belts may be adjusted to either shingle or de-shingle the mailpieces. The belt speeds of the first and second belt assemblies are different relatively to belt speeds of other belt assemblies to move a first mailpiece relative to a second consecutive mailpiece in the conveyor, wherein the first mailpiece moves either faster or slower than the second mailpiece. In this way, the first mailpiece may be moved to overlap the second mailpiece to create shingled mailpieces, or the first mailpiece of shingled mailpieces may be moved to separate from the second mailpiece to create singulated mailpieces with a distance between each singulated mailpiece. A controller may utilize image analysis software to determine dimensional aspects of the mailpieces and may utilize these dimensional aspects to control the first and/or second belt speeds of the first and second belt assemblies, respectively. For example, an exemplary mail processing system comprises a shingling conveyor and image analysis of images taken by the camera is used to determine a singulated distance, or gap distance between two consecutive mailpieces in the conveyor and the controller may adjust the belt speed, based on this gap distance, to move the first mailpiece to overlap with the second mailpiece and create shingled mailpieces. In another example, an exemplary mail processing system comprises a shingling conveyor and image analysis of images taken by the camera are used to determine a shingle overlap distance of two shingled mailpieces in the conveyor and the controller may adjust the belt speed, based on this gap distance, to move the first mailpiece away from the second mailpiece and create singulated mailpieces. It is to be understood that the controller may control the speed of one or both belts in one or more conveyors to move mailpieces relative to each other, either away from each other or towards each other to create or increase an overlap distance.

An exemplary shingling conveyor has two belt assemblies that have a mail conveyor portion, wherein a portion of the first belt and a portion of the second belt extend parallel with each other to create a pinch to grab and move mailpieces from an inlet to an outlet of the conveyor. An exemplary shingling conveyor may comprise one, two, three or more belts and any number of rollers to guide the belts. An exemplary shingling conveyor comprises a drive, such as a drive motor, that moves the belts to transfer the mailpieces. A drive motor may be coupled with one of the rollers of the shingling conveyor.

An exemplary shingling conveyor comprises a camera that takes images of the mailpieces to determine dimensional aspects including a shingled overlap distance of two shingled mailpieces or a singulated distance or gap distance between two singulated mailpieces. An exemplary camera is configured to take images of the edges of the mailpieces in the mail conveyor portion of the conveyor. The controller may then utilize these dimensional aspects to control the speeds of the belts to move a first mailpiece with respect to a second mailpiece.

An exemplary mail processing system comprises a mail processing station that performs mail processing functions including, but not limited to, address scanning, weighing on a scale, and postage application. All of these processes may be in a single mail processing station or one or more of these processes may be performed separately, as described herein. For example, singulated mailpieces may be delivered individually in a consecutive manner to a scale for weighing. Shingled mailpieces may be transferred through a mail processing station that performs address scanning and postage application. A mail processing station may or may not perform a processing function as mailpieces pass through the mail processing station.

An exemplary mail processing system comprises a shingling conveyor that receives shingled mailpieces and de-shingles them to deliver singulated mailpieces to a mail processing station comprising a scale for weighing each mailpiece individually. The singulated mailpieces may then be transferred to a shingling conveyor wherein the singulated mailpieces are shingled.

Conversely, an exemplary mail processing system comprises a shingling conveyor that shingles mailpieces to deliver the shingled mailpieces to a mail processing station comprising a scale that does not weigh each mailpiece. In this manner, when the scale is not weighing mailpieces, the shingled mailpieces may pass through the scale at a higher rate than singulated mailpieces. The shingled mailpieces may then be transferred to a shingling conveyor wherein the shingled mailpieces are singulated.

An exemplary method of processing mail utilizing a mail processing system as described herein comprises at least one conveyor and a mail processing station. An exemplary method of processing mail comprises the steps of de-shingling shingled mailpieces and then weighing them in a mail processing station and subsequently re-shingling the mailpieces in a shingling conveyor.

A further exemplary method of processing mail comprises passing singulated mailpieces through a mail processing system in a first pass to weigh the mailpiece then passing the mailpieces through the mail processing system in a second pass in a shingled fashion until the mailpieces pass a scale, then singulating the mailpieces to perform other mail processing steps such as address scanning and/or postage application.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
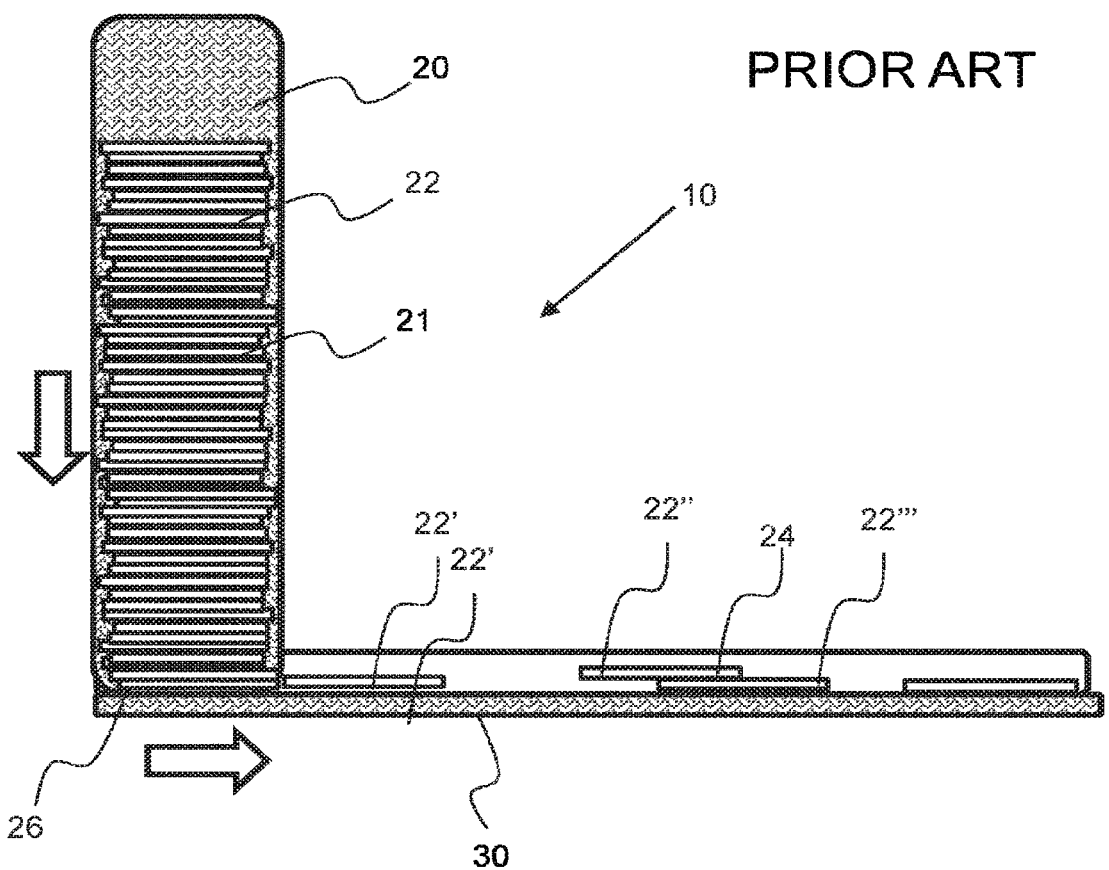
FIG. 1 shows top view of a standard loading system.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

As shown in FIG. 1, a conventional mail loading system 10 has a loading conveyor 20 that advances a mail stack 21 comprising a plurality of mailpieces 22 toward a mail feeder 30. The front mailpiece 26 is pulled by the mail feeder 30 to provide a stream of individual mailpieces 22'. Sometimes the mail feeder draws two mailpieces at a time, due to high pressure on the feeder and/or friction between the mailpieces, to create "shingled" mailpieces 24, wherein there is an overlap between the two individual mailpieces 22″ and 22‴. Generally, such double-feeding of mailpieces is not desirable if it is unintentional. However, multiple consecutive mailpieces are sometimes intentionally "shingled" similar to a row of shingles on a roof.

Figure 2:
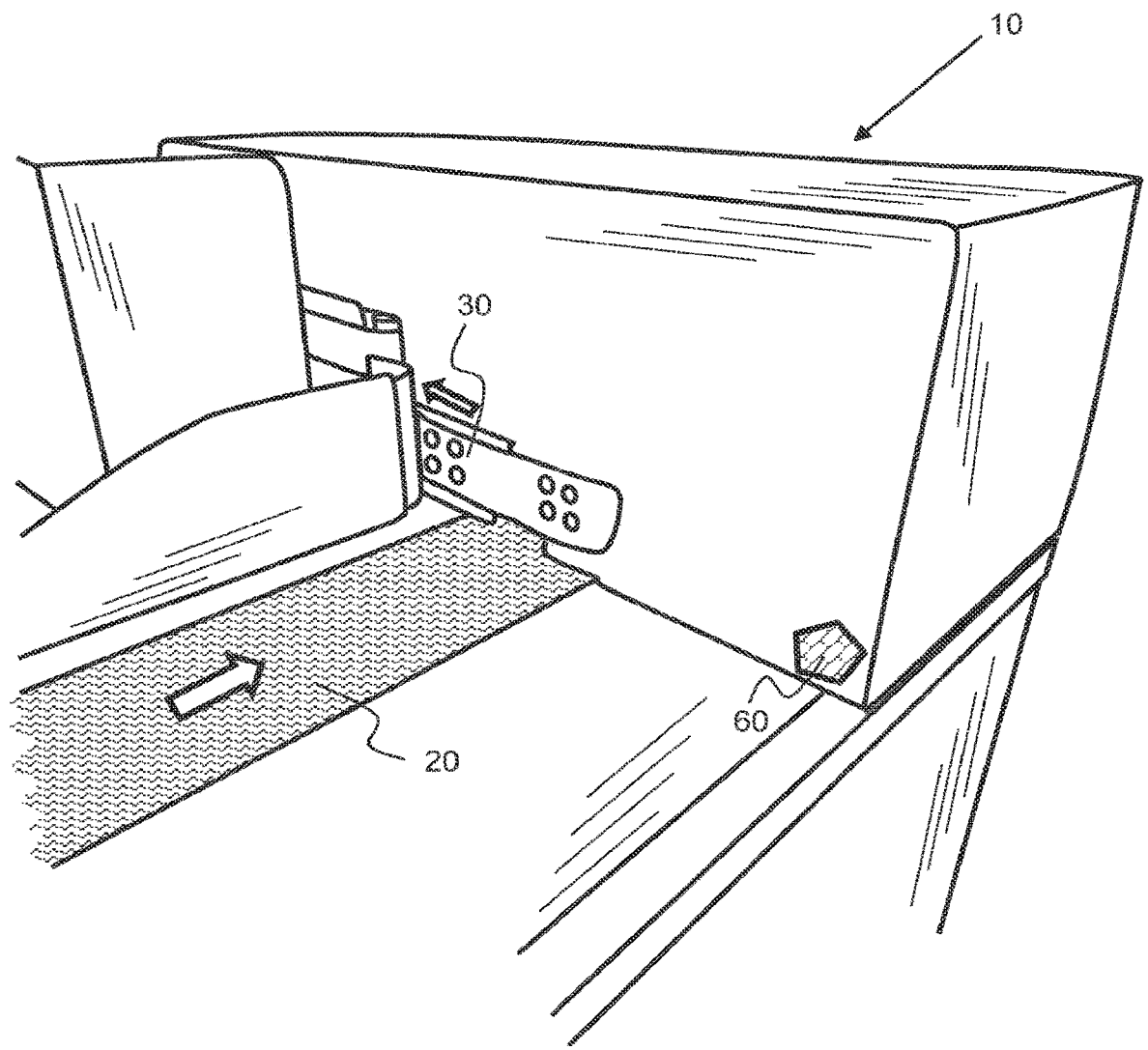
FIG. 2 shows a perspective view of an exemplary mail loading system.
Figure 3:
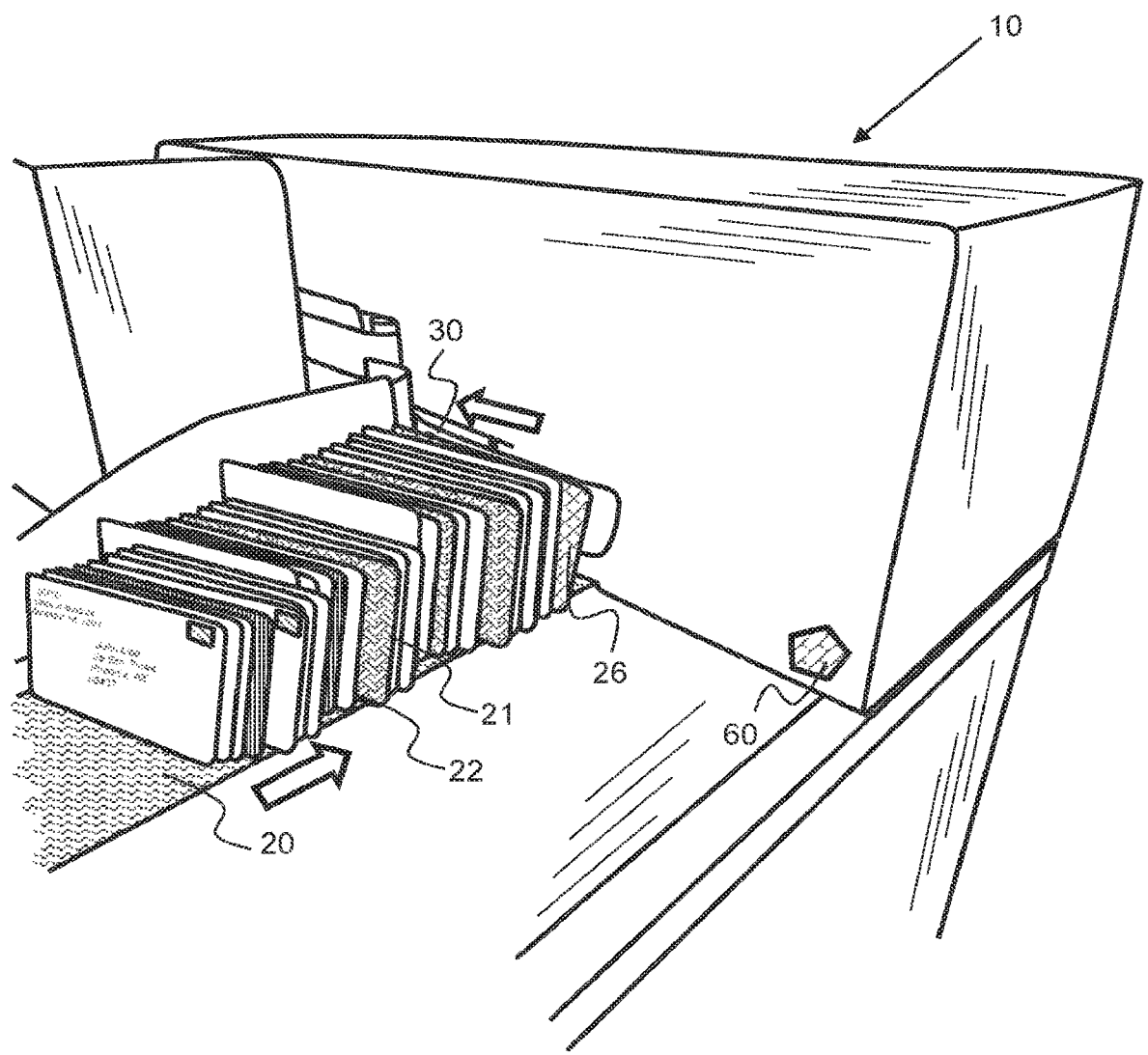
FIG. 3 shows a perspective view of an exemplary mail loading system having a mail stack pressing on the loading conveyor.

Referring to FIGS. 2 and 3, a conventional mail loading system 10 has a loading conveyor 20 that advances mail towards the mail feeder 30. The front mailpiece is fed into the mail feeder 30. The mail feeder advances the mailpieces in a substantially perpendicular direction from the advancing direction of the loading conveyor, as shown by the bold arrows in FIG. 3. The mail stack presses on the mail feeder and one or more mailpieces are advanced into the mail processing system. A controller 60 controls the speed of the conveyor and may control the speed of the mail feeder.

Figure 4:
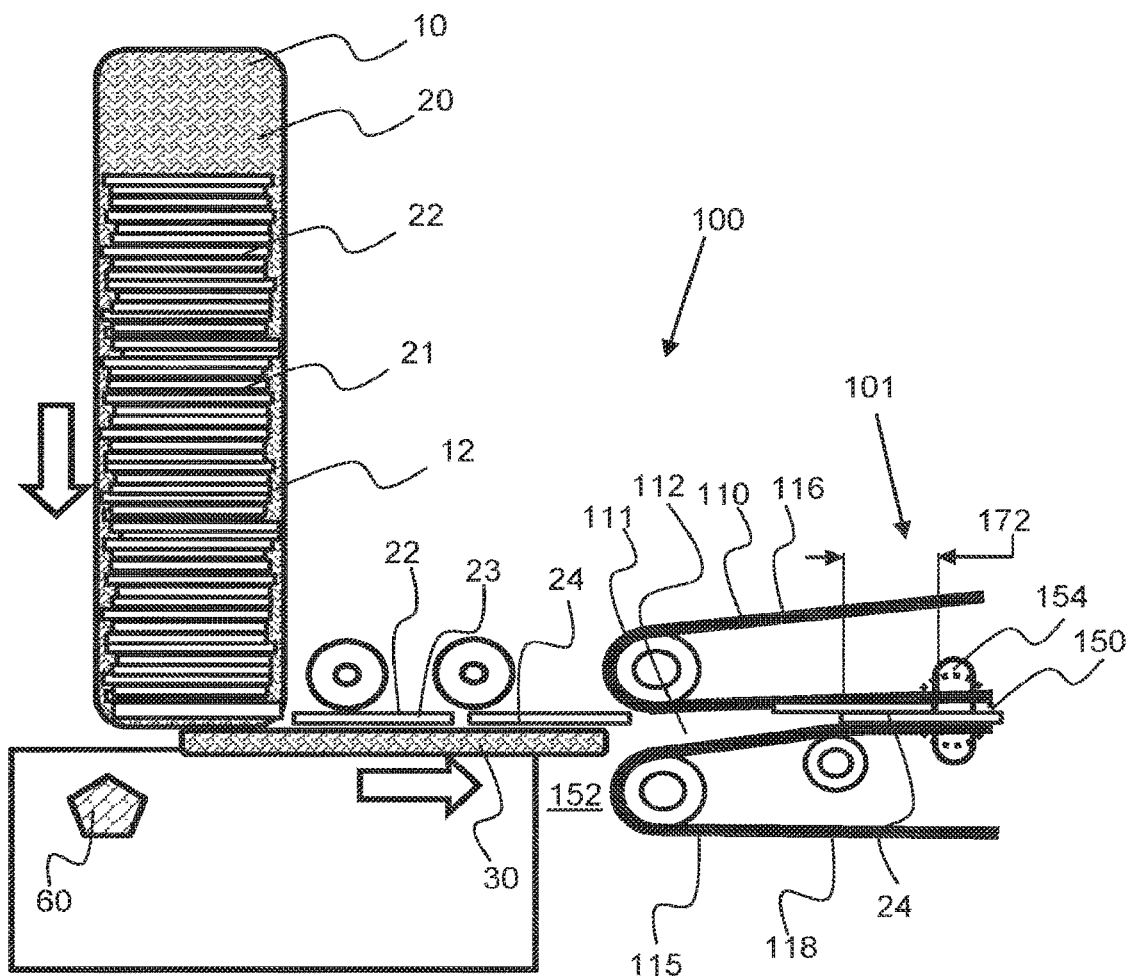
FIG. 4 shows a top view of a portion of an exemplary mail processing system having a first mail conveyor receiving mailpieces from the loading mail feeder.

As shown in FIG. 4, a portion of an exemplary mail processing system 100 has a conveyor 101, and a shingling conveyor 110, that is receiving mailpieces from the mail feeder 30. The shingling conveyor has a first belt assembly 111 and a second belt assembly 115 that form an inlet 112 between a first belt 116 and a second belt 118. A camera 50 is configured below the platform 152 and is taking images of the mailpieces as they pass through the shingling conveyor to determine an overlap distance 170 of the shingled mailpiece 24. Shingled mailpieces 24 are shown being transported through the shingling conveyor. The belt speeds of consecutive conveyors and/or shingling conveyors may be different in order to de-shingle the mailpieces or to advance at least one of shingled mailpieces at a faster rate to create a gap between the mailpieces, or singulated mailpieces.

Figure 5:
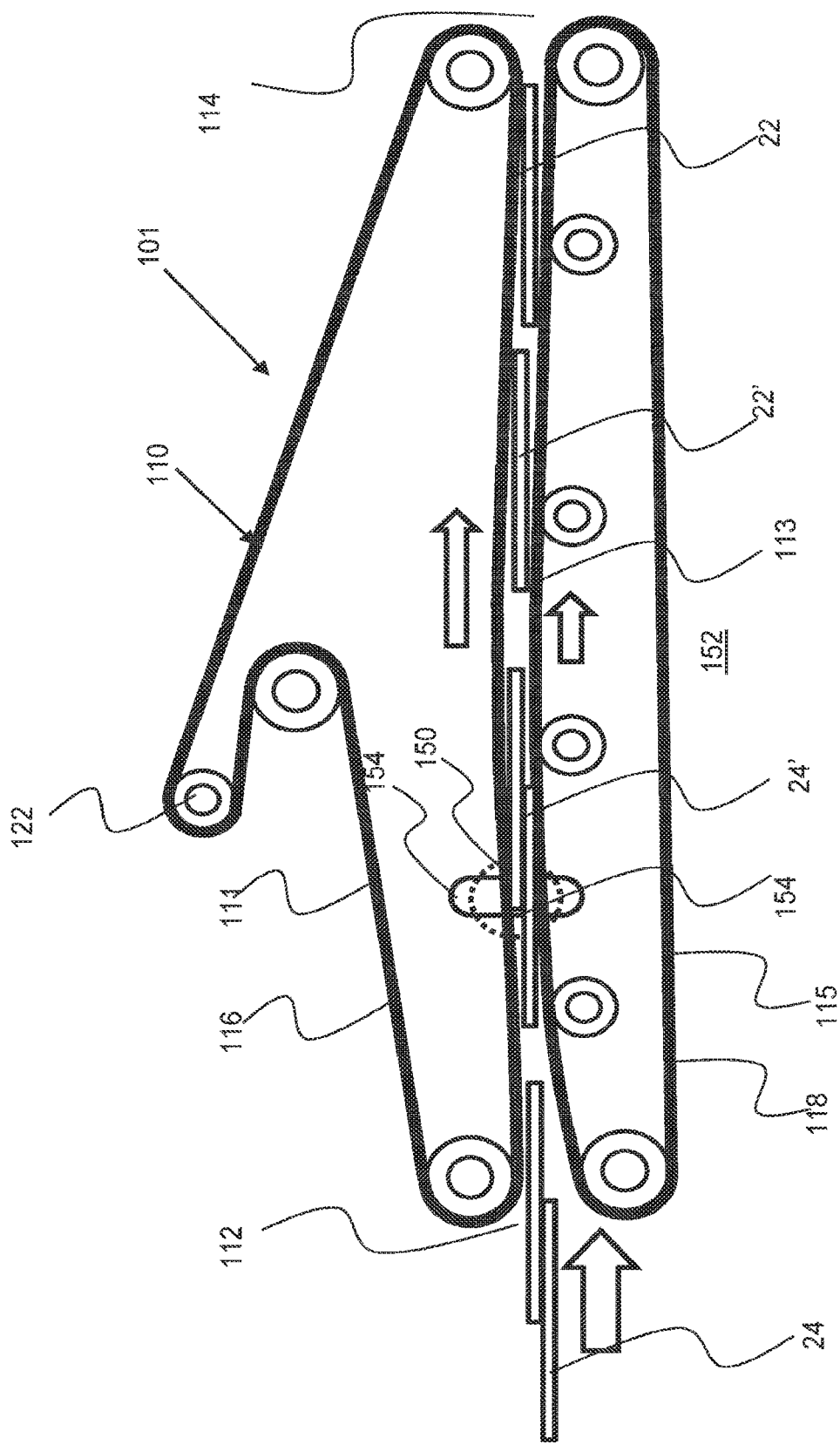
FIG. 5 shows a top view of an exemplary mail shingling conveyor having a first and a second belt and a camera to determine a mail overlap.

As shown in FIG. 5, an exemplary mail conveyor 101, a shingling conveyor 110, has a first belt assembly 111 comprising a first belt 116 and a second belt assembly 115 comprising a second belt 118 that form a mail conveying portion 113, that extends from the inlet 112 to the outlet 114. A camera 150 is configured to take images of mailpieces within the mail conveying portion to determine a mail overlap of the shingled mailpieces 24 as they pass through the shingling conveyor. The camera is mounted under the platform 152 and views the mailpieces through an opening 154 in the platform. Shingled mailpieces enter the inlet 112 of the shingling conveyor 110 and exit the outlet 114 of the shingling conveyor to be passed to a second shingling conveyor operating at a higher belt speed in order to singulate the shingled mailpieces. The shingling conveyor has a plurality of rollers 122 for guiding the belts. A shingling conveyor 110 is a type of conveyor 101, a conveyor that may operate at different speeds in order to control an amount of shingling of mailpieces.

Figure 6:
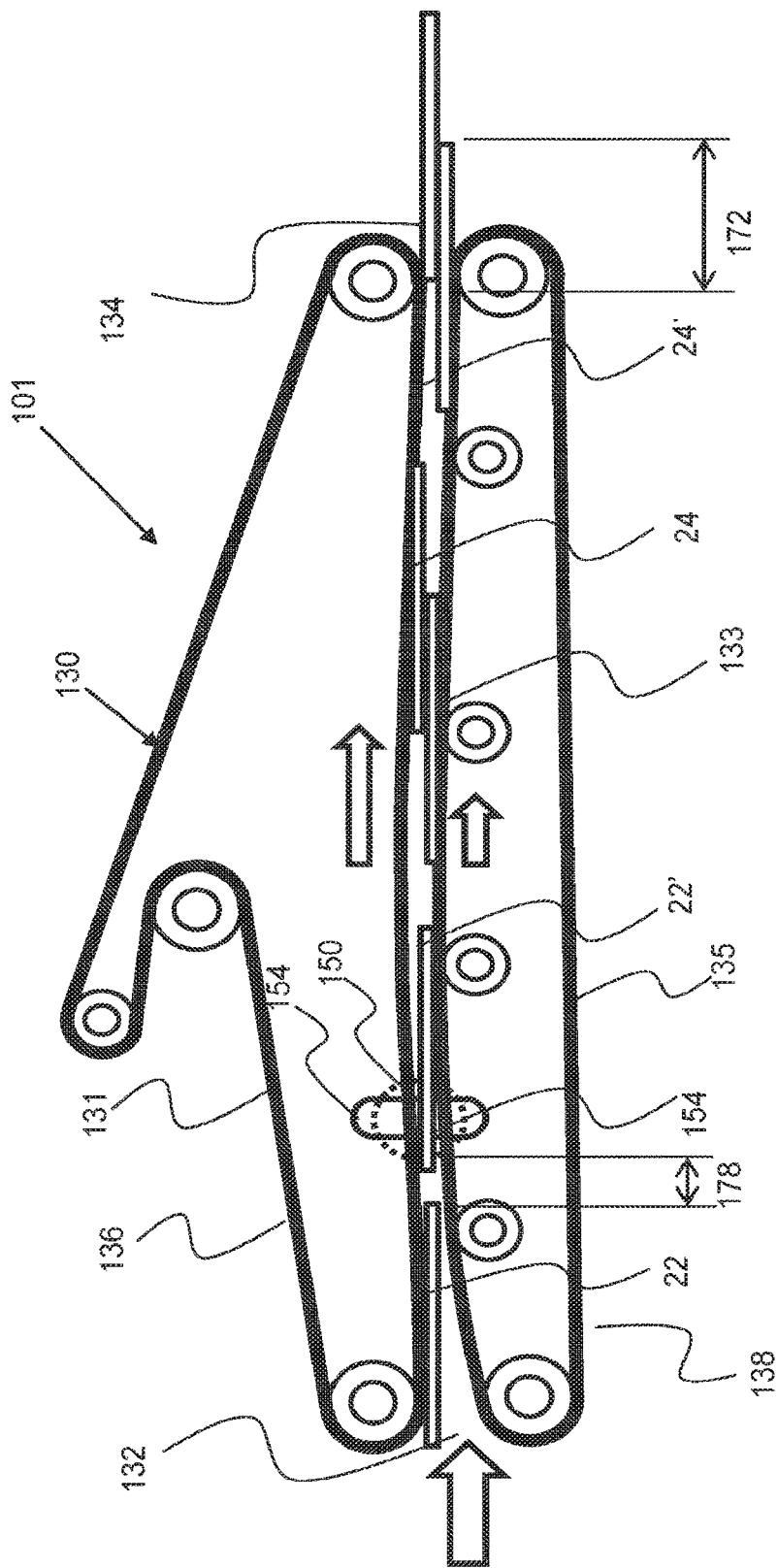
FIG. 6 show a top view of an exemplary mail shingling conveyor having a camera mounted under the platform and viewing the mail through an opening in the platform to determine a mail overlap.

As shown in FIG. 6, an exemplary mail conveyor 101, a mail shingling conveyor 130, has a first belt assembly 131 comprising a first belt 136 and a second belt assembly 135 comprising a second belt 138 that form a mail conveying portion 133, that extends from the inlet 132 to the outlet 134. A camera 150 is configured to determine a singulated distance 178 between individual mailpieces 22, 22' in series between the belts of the shingling conveyor. The camera is mounted under the platform 152 and views the mailpieces through an opening 154 in the platform. Singulated mailpieces 22 enter the inlet 112 of the shingling conveyor and exit the outlet 114 of the shingling conveyor to be passed to a second shingling conveyor operating at a lower speed in order to shingle the singulated mailpieces. The shingling conveyor has a plurality of rollers 122 for guiding the belts. A shingling conveyor 130 is a type of conveyor 101, a conveyor that may operate at different speeds in order to control an amount of shingling of mailpieces.

Figure 7:
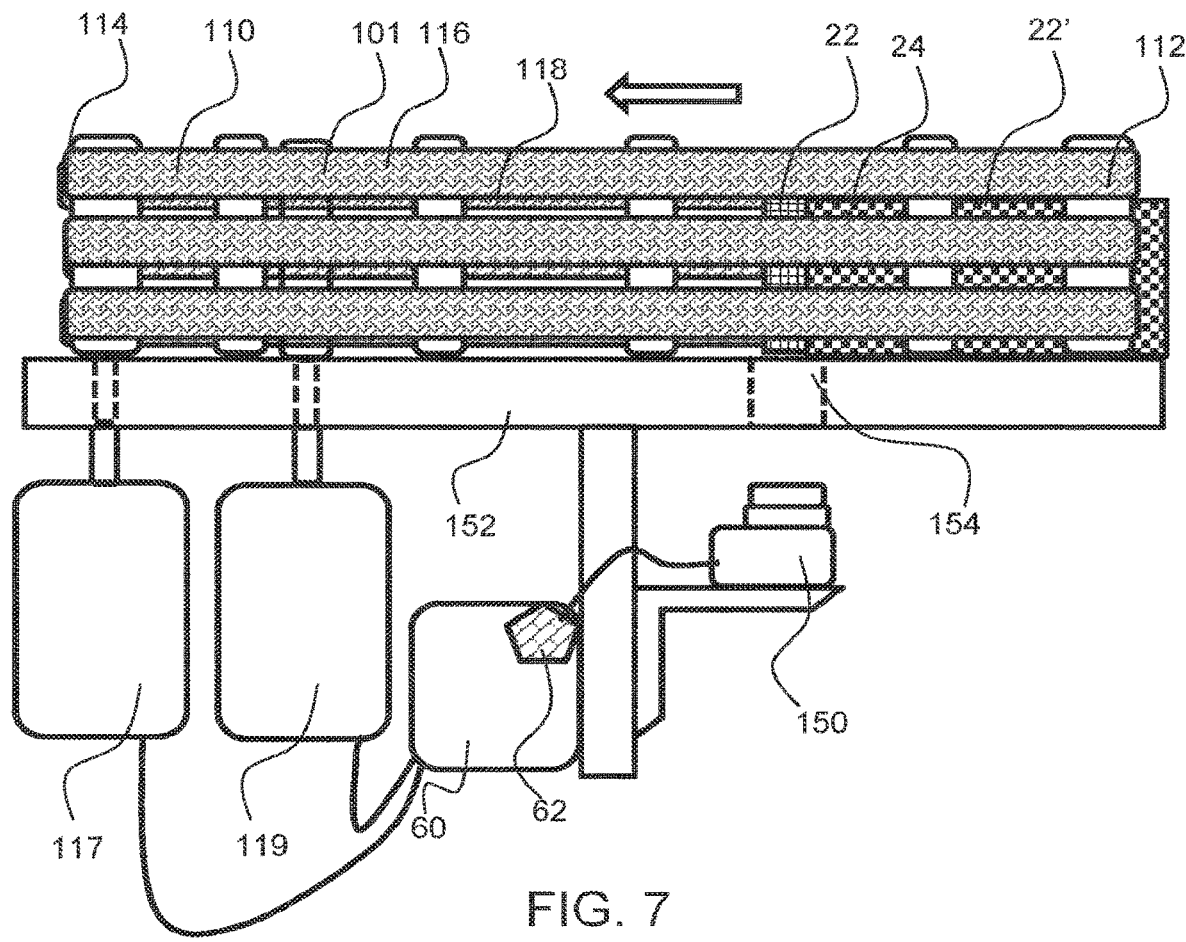
FIG. 7 shows a side view of an exemplary shingling conveyor.
Figure 8:
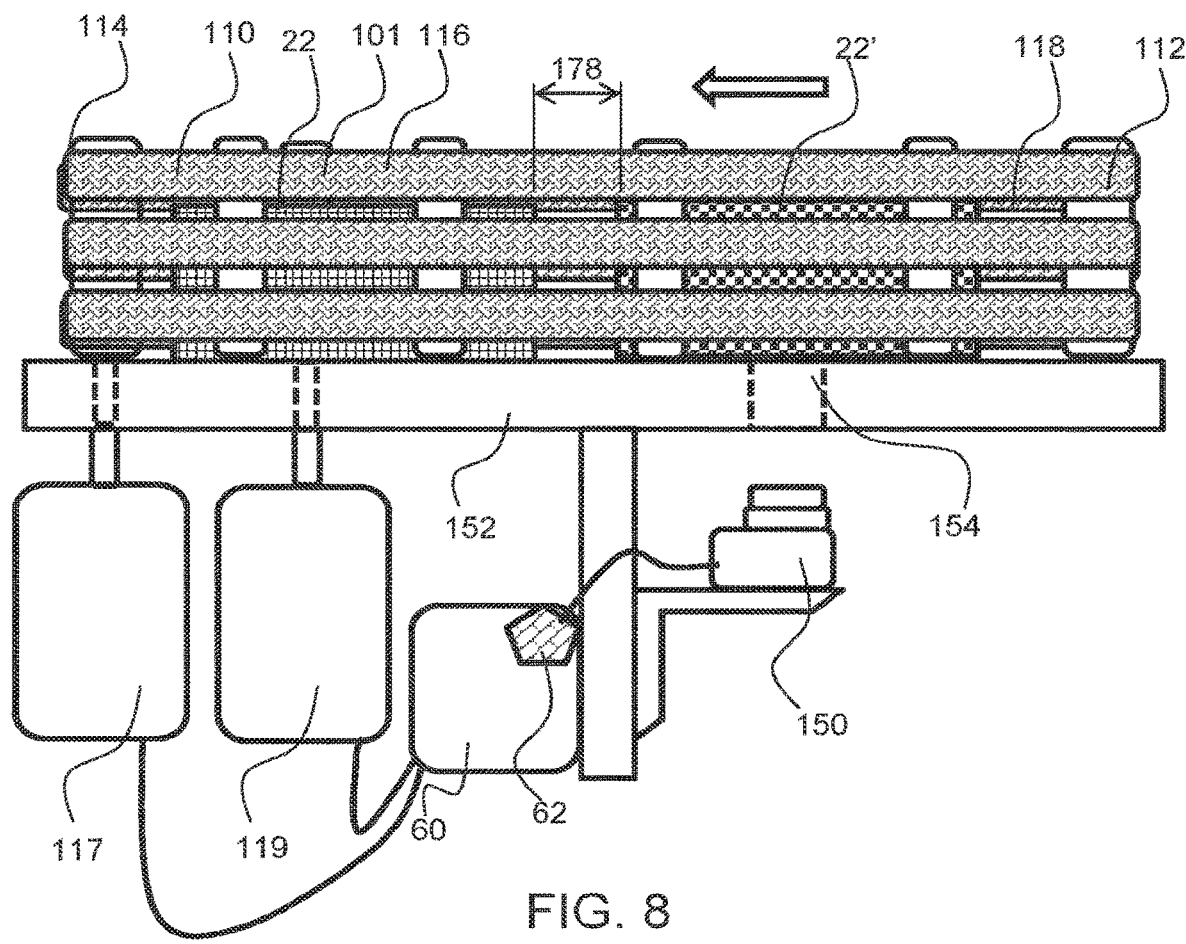
FIG. 8 shows a side view of an exemplary shingling conveyor.

Referring to FIGS. 7 and 8, an exemplary mail conveyor 101, such as a shingling conveyor 110, has a camera 150 mounted under the platform 152 for taking images of the mailpieces as they move through the shingling conveyor 110. The mailpieces 22, 22' are shingled mailpieces 24 having an overlap distance. As shown in FIG. 7, a mailpiece singulated distance 178 may be formed between the two individual mailpieces 22 22'.

Figure 9:
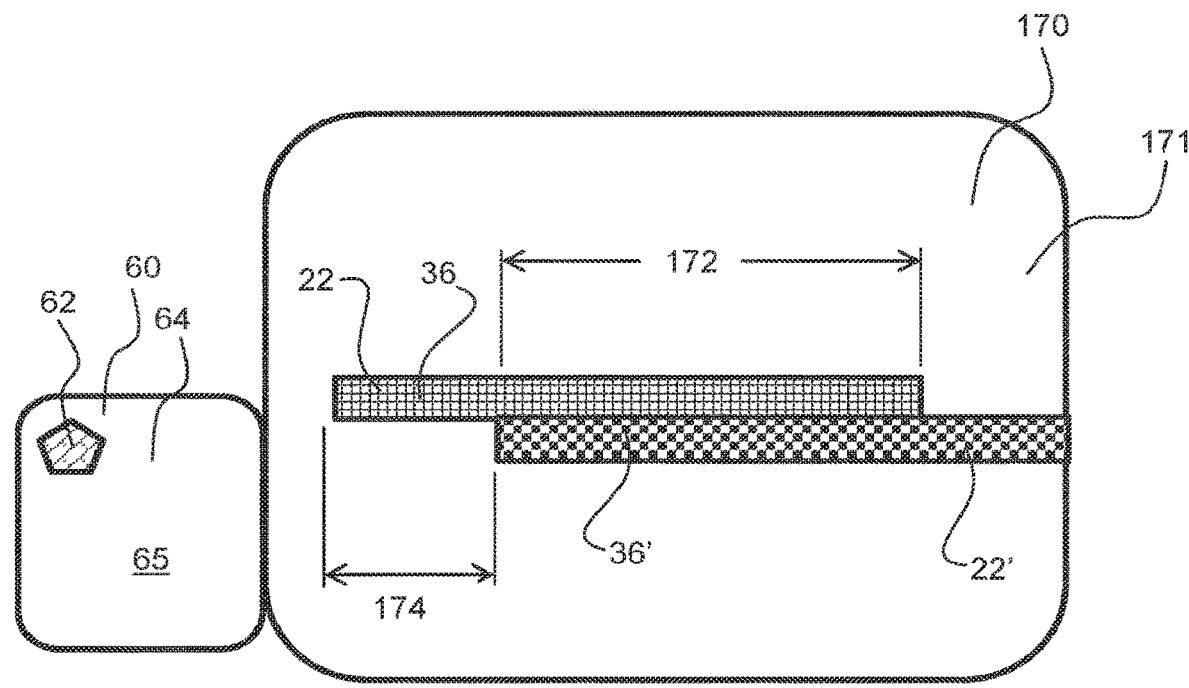
FIGS. 9 and 10 show exemplary images captured by a camera of mailpieces in a conveyor.
Figure 10:
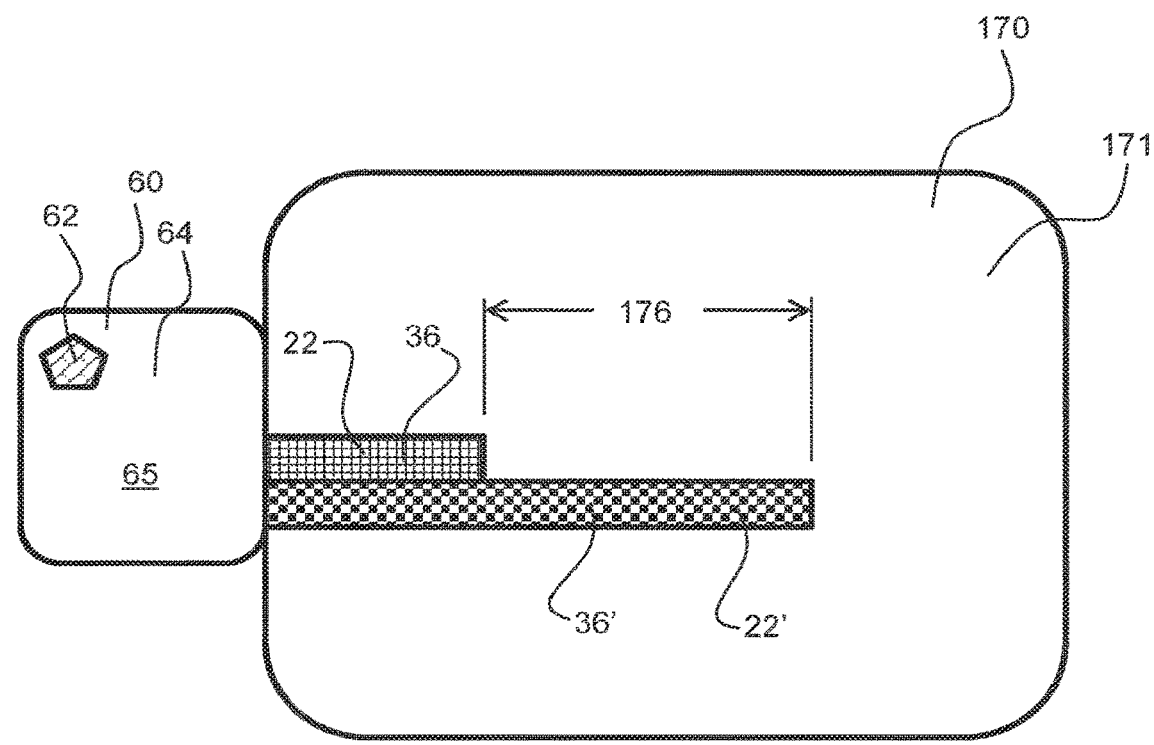

As shown in FIGS. 9 and 10, images 170, such as digital images 171 taken by the camera provide dimensional aspects related to the mailpieces. The image is of the edges 36, 36' of a first and second mailpiece 22, 22', respectively. Image analysis software 64 is used to determine dimensional aspects of the mailpieces including shingle overlap distance 172, leading offset distance 172, trailing offset distance 176 and singulated distance 178, shown in FIG. 7. One or more of these distances determined through image analysis of the images 170 is used by the controller 60, which may comprise a microprocessor 62 and/or a computer 65, to control the speed of shingling conveyors to de-shingle or shingle the mailpieces. The image analysis software 64, or computer program is run by a computing device, such as a computer 65. If computer 65 determines that the mailpieces are shingled when they should not be, computer 65 can cause the mail processing system to stop processing mailpieces or to direct the shingled mailpieces to a reject bin. This ensures that mailpieces do not stick to each other during portions of the mail processing in which the mailpieces should be singulated. Additionally, computer 65 can determine through image analysis of images 170 if mailpieces are non-uniform in size and controller 60 can use information regarding non-uniformity of size to make real-time adjustments to the speed of shingling conveyors.

Figure 11:
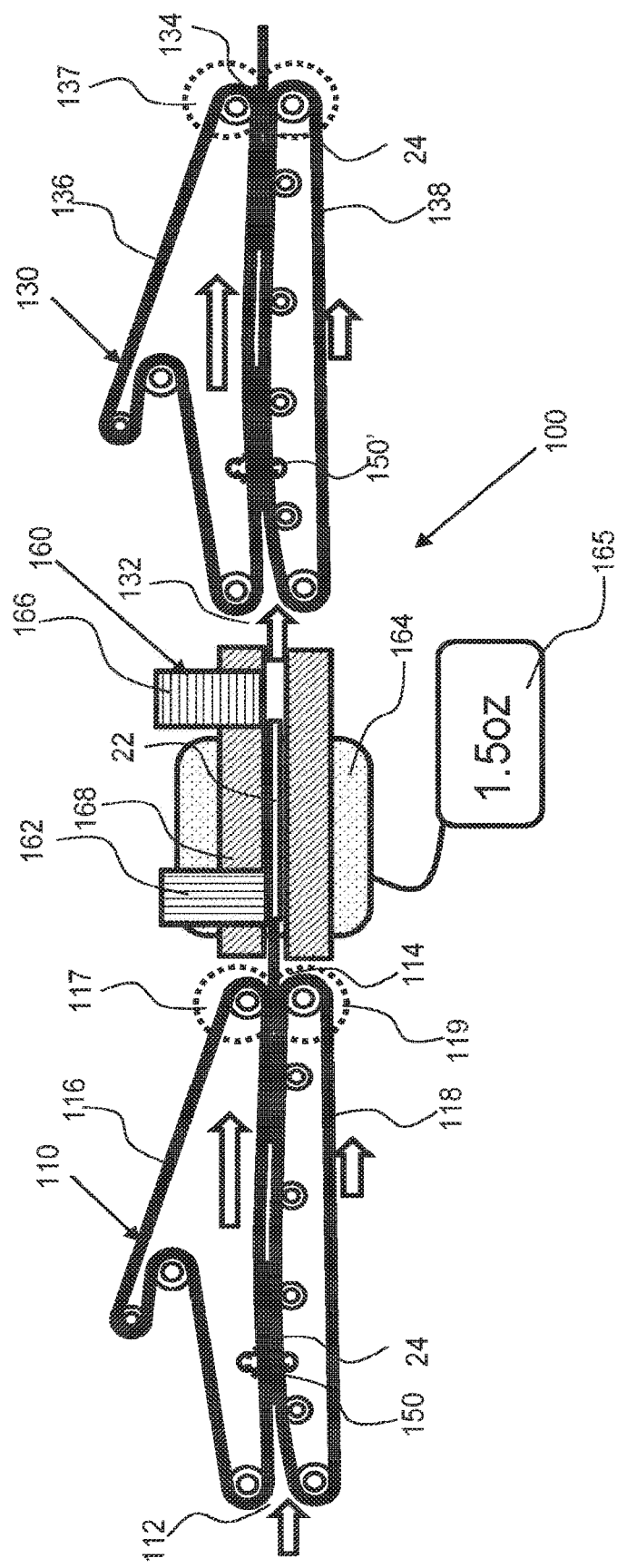
FIG. 11 shows a top view of an exemplary mail processing system having a first mail shingling conveyor a mail processor and a second mail shingling conveyor.

As shown in FIG. 11, an exemplary mail processing system 100 has a first mail shingling conveyor 110, a mail processor 160 and a second mail shingling conveyor 130 configured in series, wherein singulated mailpieces are received by the mail processor from the first shingling conveyor and received by the second shingling conveyor from the mail processor. In this mail processing system 110, shingled mailpieces are de-shingled by the first shingling conveyor 110 to provide singulated mailpieces, or mailpieces in series with a singulated distance between them to the mail processor. Alternatively, if the first shingling conveyor 110 receives singulated mailpieces, the first shingling conveyor maintains the mailpieces in singulated fashion and transports them to the mail processor. The mail processor may comprise an address scanner 162 to determine an address for delivery, a scale 164 to determine the weight of each mailpiece, and/or a postage applicator 166, that stamps or otherwise marks the mailpiece with appropriate postage. A scale display 165 shows the weight of mailpiece 22 in the mail processor 160. A mail processor may also comprise any other apparatus desired that performs a mail processing function. For example, a mail processor may comprise a biohazard check apparatus, consisting of a roller that compresses a mailpiece to force air out of the mailpiece and a vacuum and sensor apparatus configured to check the air for hazardous substances.

As described herein, weighing of mailpieces can be a slower step than other process steps in a mail processing system because it requires singulated mailpieces and processes the mailpieces at a slower throughput rate than other portions of the system. Accordingly, when the scale 164 is used to weigh mailpieces, an exemplary mail processing system 100 uses a first mail shingling conveyor 110 to ensure mailpieces are singulated before they are weighed by scale 164. When the scale 164 is not used to weigh mailpieces, for example when a weight is not required for the processing being performed, an exemplary mail processing system 100 uses a first mail shingling conveyor 110 to ensure mailpieces are shingled before they pass through scale 164. In this manner, a greater number of mailpieces may pass through scale 164 in a set amount of time despite scale's 164 relatively slow rate of transfer of mailpieces. The second mail shingling conveyor 130 singulates the mailpieces after they pass through the scale 164 for subsequent conveyors operating at a higher rate of speed and processing by other mail processors that are not as rate-limited as scale 164. Some commercially available scales include belts that are part of the scale unit. Scale belts may sometimes be settling belts in which mailpieces settle on top of a belt rather than pinched between two belts. Scale belts frequently operate only at a certain relatively slow belt speed. Thus, scale belts may also be used as shingling conveyors if they operate at a slower or faster belt speed than the belt speed of the preceding conveyor.

Figure 12:
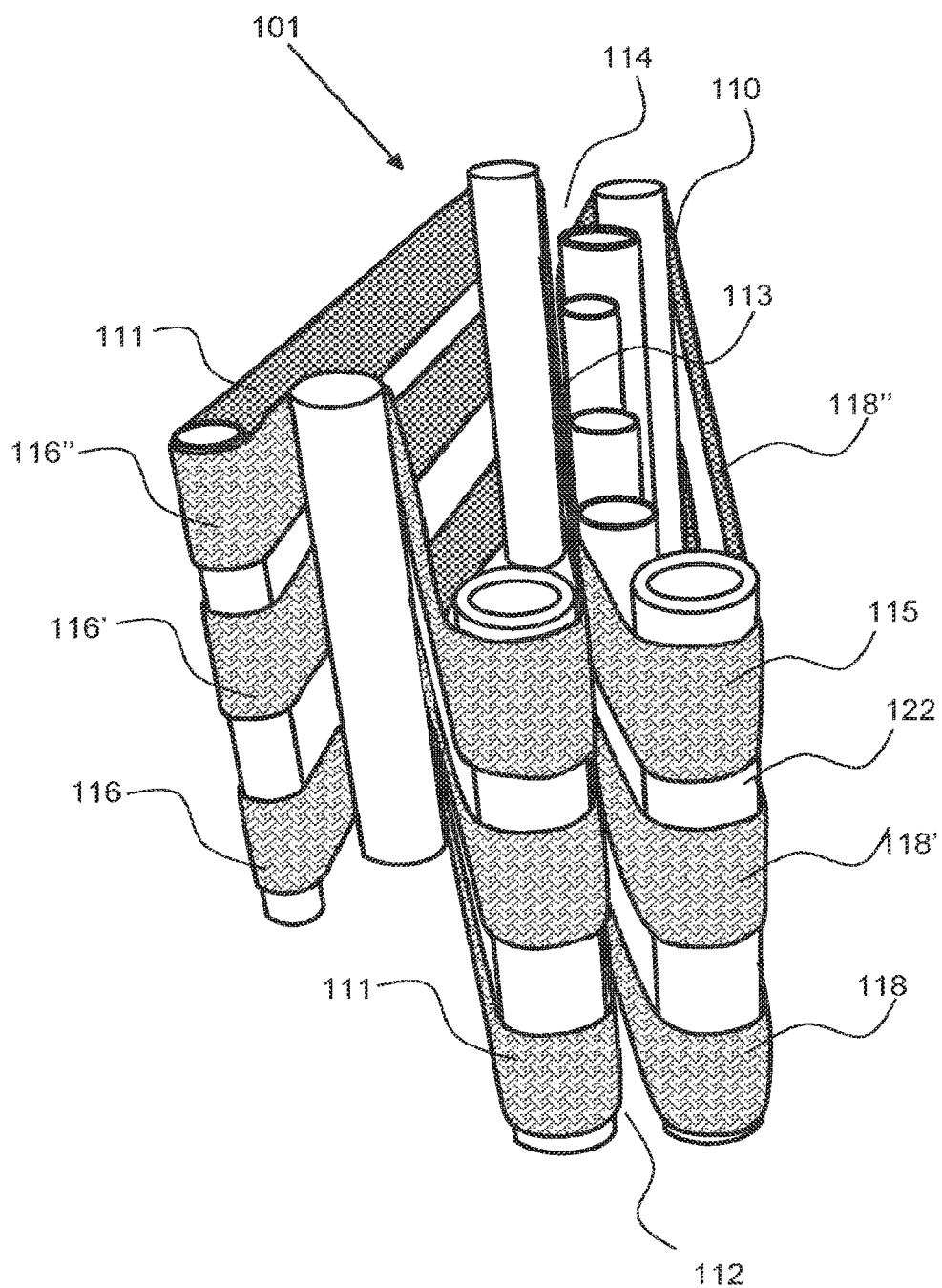
FIG. 12 shows a perspective view of a mail conveyor having conveyor belts and conveyor rollers.

As shown in FIG. 12, an exemplary conveyor 101, a shingling conveyor, has conveyor belts 116, 118 and a plurality of rollers 122 to support and guide the belts. It is to be understood that any number of belts may be configured on the first belt assembly 111 or second belt assembly 115. The belt or belts of the first belt assembly 111 have a portion or extension that runs substantially parallel with a portion of the second belt assembly 115 to produce a mail conveying portion 113 between the two belt assemblies. As shown in FIG. 12, the first belt assembly has three belts and the second belt assembly has three belts that run parallel with the belts from the first belt assembly in the mail conveying portion 113. Mailpieces will be pinched between the two belts 116, 118 to move the mailpieces from the inlet 112 to the outlet 114 of the conveyor 101.

Figure 13:
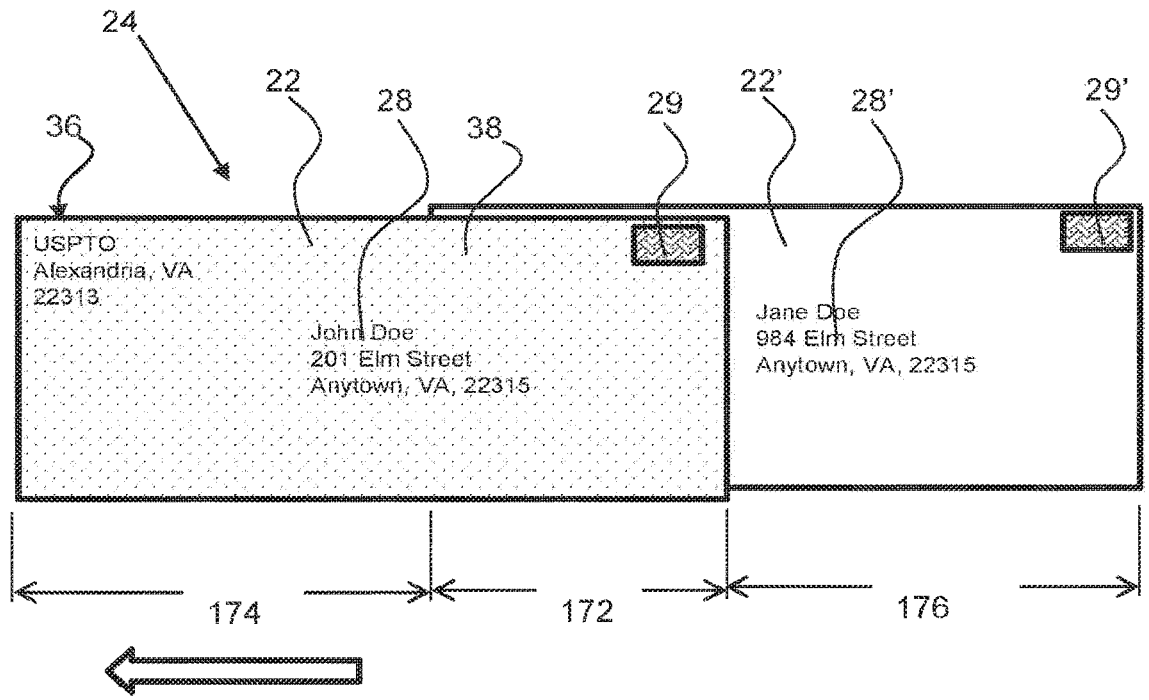
FIG. 13 shows a side view of shingled mailpieces.

As shown in FIG. 13, two mailpieces 22, 22' are shingled mailpieces 24, wherein the first mailpiece 22 overlaps the second mailpiece 22' by a shingle overlap distance 172. The first mailpiece 22 has a leading offset distance 174 and the second mailpiece has a trailing offset distance 176. These dimensional features of the mailpieces may be determined through image analysis of images captured by a camera as the mailpieces move through a conveyor. Shingled mailpieces may include two, three or more mailpieces, wherein each mailpiece overlaps with a leading and trailing mailpiece. The camera may take images of the edges 36 of the mailpieces. The address scanning may view the address 28 on the face 38 of the mailpieces and the overlap distance 172 may be small enough for the address of shingled mailpieces to be scanned. The postage 29 is shown being applied to the mailpieces.

Figure 14:
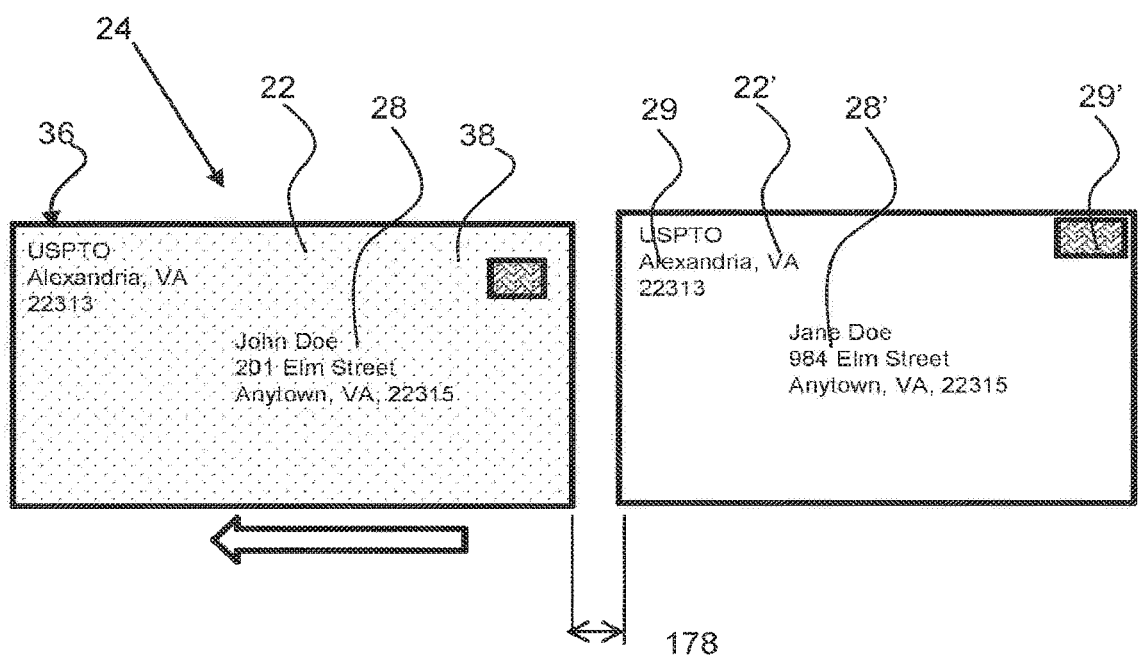
FIG. 14 shows a side view of singulated mailpieces.

As shown in FIG. 14, two mailpieces 22, 22' are singulated mailpieces wherein there is not overlap of the two mailpieces and there is a singulated distance 178, or gap distance between the two mailpieces.

As described above, one exemplary embodiment of the invention allows for multiple passes of mailpieces through the mail processing system, including a first pass in which scale 164, as shown in FIG. 11, weighs singulated mailpieces, and a second pass in which scale 164 does not weigh mailpieces but shingled mailpieces pass through scale and are subsequently singulated for further processing.

Scales used in mail processing systems must be approved by the relevant postal authority in the geographic area in which the mail processing system is to be used. For example, in the United States, a mail processing system must have a scale approved by and registered with the United States Postal Service if the mail processing system is to be used to process outbound mail requiring weighing and the addition of postage. Such approved scales generally have the major drawback of operating at relatively slow speeds. Approved scales typically operate at approximately 80 inches per second, meaning that they can accurately weigh mailpieces that travel over the scale only at a speed in which the scale receives a maximum of 80 inches of mailpiece length each second. 80 inches per second is approximately equivalent to 10,000 average mailpieces per hour. By contrast, advances in digital cameras, computer processors, and feeding and sorting mechanisms have enabled mail processing systems to otherwise operate at speeds of up to 30,000 mailpieces per hour, or even higher. The scale is therefore the speed-limiting step of most mail processing systems. This speed limitation is compounded by the fact that mailpieces are often sorted in multiple passes through the mail processing system, but need only be weighed by the scale during one of the multiple passes. Such scales generally cannot be adjusted to run at different speeds, meaning that mailpieces pass through the scale at a set rate of inches per second regardless of whether the scale is actually weighing the mailpieces. The mere presence of an approved scale in a mail processing system, therefore, may significantly slow down processing of mail even when weighing is not required for the particular processing being done on a given pass. These slower speeds can add up to significant delays and costs.

In this exemplary embodiment, mailpieces are processed in two passes through a mail processing system. In the first pass, the mailpieces are weighed by scale 164. In the second pass, the mailpieces are not weighed by scale 164 and it is desired that the processing of the second pass not be limited by the speed of the scale.

In the first pass, mailpieces are fed into the mail processing system. First and second mail shingling conveyors shown in FIG. 11 are adaptable to rotate at varying belt speeds depending on the purpose of the current pass for which mailpieces are being processed. The mailpieces proceed into the mail processing system in a shingled fashion. Before the line of shingled mailpieces reaches scale 164, they reach first mail shingling conveyor 110, which rotates at a higher speed relative to previous conveyors. When the leading edge of a mailpieces reaches first mail shingling conveyor 110, it is "yanked" forward by the higher relative speed, separating it from the other mailpieces with which it was shingled. In this manner, mailpieces are singulated before they reach scale 164 and are thus weighed one mailpiece at a time by scale 164. The mailpieces then proceed to second mail shingling conveyor 130 and through the remainder of the mail processing system. The speed of the first pass is limited by the maximum speed at which scale 164 can weigh mailpieces, approximately 10,000 mailpieces per hour.

In the second pass, mailpieces proceed through the mail processing system in the same path as the first pass. In the second pass, first mail shingling conveyor 110 rotates at the same speed as previous conveyors. Thus, the shingled mailpieces remain shingled as they pass through first mail shingling conveyor 110 and scale 164. In this pass, second mail shingling conveyor 130 rotates at a higher speed relative to the speed of first mail shingling conveyor 110 and scale 164. When the leading edge of a mailpiece reaches second mail shingling conveyor 130, it is yanked forward by the higher relative speed, separating it from other mailpieces with which it was shingled. In this manner, mailpieces are singulated after they have passed through scale 164 and can then be processed in any number of ways other than weighing such as sorting, barcode reading, barcode printing, optical character scanning, etc. When mailpieces are shingled, a greater number can proceed through scale 164 in a period of time (approximately 20,000 mailpieces per hour) than can proceed through scale 164 in the same period of time if the mailpieces are singulated and separated by a singulated distance 178 (approximately 10,000 mailpieces per hour).

Thus, the mail processing system can be adapted to operate in a manner such that mailpieces proceed through scale 164 in either a singulated or shingled fashion depending on whether weighing is required for a particular pass of mailpiece processing. Mailpieces proceed through scale 164 in a singulated fashion in a pass for which weighing is required. Optimally, mailpieces pass through scale 164 at the maximum rate (approximately 80 inches per second) of scale 164. In a pass for which weighing is not required, the mailpieces pass through scale 164 in a shingled fashion and can pass through scale 164 at a higher rate (approximately 20,000 mailpieces per hour) than in a weighing pass (approximately 10,000 mailpieces per hour) because the shingling allows a greater number of mailpieces in a given number of inches.

In a second exemplary embodiment, mailpieces are processed in a single pass through a mail processing system and a mail processing system with a larger footprint may be used. In this embodiment, mailpieces enter the mail processing system in shingled fashion. Using first and second mail shingling conveyors 110, 130, the mail processing system singulates shingled mailpieces and directs every other mailpiece to a first scale 164 and a second scale 164'. By using two or more separate scales 164, 164' in parallel, the mail processing system may maintain a higher overall throughput speed, despite having to singulate mailpieces for weighing.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A mail processing system comprising:
   a) a first conveyor and a second conveyor, each comprising:
      iii) an inlet; and
      iv) an outlet;
   b) a camera configured to capture images of said mailpieces;
   c) a controller;
   d) image analysis software configured to determine dimensional aspects with respect to a first mailpiece and a second mailpiece in series;
   e) a mail processing station configured between the first conveyor and the second conveyor that receives mailpieces from the outlet of the first conveyor, said mail processing station comprising at least one of a scale to measure the weight of the mailpieces and an address scanner to determine a mailing address of said mailpieces;
   wherein the second conveyor is configured to receive mailpieces from the mail processing station;
   wherein the controller controls the speed of each conveyor to move said first mailpiece relative to said second mailpiece so as to achieve a desired distance or degree of overlap between said first mailpiece and said second mailpiece;
   wherein in a first pass, the first mailpiece and the second mailpiece are singulated in the mail processing station, and singulated in the second conveyor;
   whereby the first and second mailpieces exit the outlet of the second conveyor as singulated mailpieces;
   wherein in a second pass, the first mailpiece and the second mailpiece are shingled in the mail processing station, the first mailpiece and the second mailpiece are singulated in the second conveyor from the shingled mailpieces in the mail processing station,
   whereby the first and second mailpieces exit the outlet of the second conveyor as singulated mailpieces.

2. The mail processing system of claim 1, wherein the camera determines a shingle overlap distance and detects if the mailpieces are singulated.

3. The mail processing system of claim 2, wherein the camera and the image analysis software determine a singulated distance or an overlap distance and rejects mail pieces that are shingled.

4. The mail processing system of claim 1, wherein each of the first conveyor and a second conveyor comprise:
   i) a first belt assembly comprising:
      a first belt;
      a first drive;
   ii) a second belt assembly comprising:
      a second belt;
      a second drive;
   wherein the first belt and the second belt of both the first conveyor and the second conveyor extend substantially parallel to each other to convey mailpieces from said inlet to said outlet;
   wherein the first belt of the second conveyor is driven at a faster belt speed than the second belt of the second conveyor to singulate the first and second mailpieces.

5. The mail processing system of claim 1, wherein the mail processing station comprises said address scanner to determine a mailing address of said mailpieces.

6. The mail processing system of claim 5, wherein the mailpieces are scanned by the address scanner to determine said mailing address in said second pass.

7. The mail processing system of claim 5, wherein the mail processing station further comprises a postage applicator that marks the mailpieces with postage.

8. The mail processing system of claim 7, wherein the mail mailpieces are marked with postage by the postage applicator in the second pass.

9. The mail processing system of claim 1, wherein the mail processing station further comprises a postage applicator that marks the mailpieces with postage.

10. The mail processing system of claim 8, wherein the mail mailpieces are marked with postage by the postage applicator in the second pass.

11. The mail processing system of claim 1, comprising two scales and wherein the second conveyor receives mailpieces from each of the two scales.

* * * * *